United States Patent [19]
Clendening et al.

[11] Patent Number: 5,273,128
[45] Date of Patent: * Dec. 28, 1993

[54] HOVERCRAFT CONTROL SYSTEM

[76] Inventors: Leslie Clendening; John Schwingshandl, both of 111 Christie Street, P.O. Box 39, Rural Route No. 1, Rockwood, Ontario, Canada, N0B 2K0

[*] Notice: The portion of the term of this patent subsequent to Feb. 28, 2009 has been disclaimed.

[21] Appl. No.: 523,804

[22] Filed: May 15, 1990

[51] Int. Cl.⁵ ............................................. B60V 1/11
[52] U.S. Cl. ................................................ 180/120
[58] Field of Search ............... 180/116, 117, 120, 121, 180/122, 124, 126, 127, 129, 119, 128; 114/67

[56] References Cited

U.S. PATENT DOCUMENTS

| | | | |
|---|---|---|---|
| 3,208,543 | 9/1965 | Crowley | 180/121 |
| 3,342,278 | 9/1967 | Cocksedge | 180/117 |
| 3,561,558 | 2/1971 | Parkerhouse | 180/116 X |
| 3,589,058 | 6/1971 | Labat | 180/117 X |
| 3,605,937 | 9/1971 | Kirwan | 180/120 |
| 3,746,116 | 7/1973 | Schwingshandl | 180/121 |
| 3,877,408 | 4/1975 | Crowder | 180/117 X |
| 4,056,159 | 11/1977 | Evans | 180/120 |
| 4,175,637 | 11/1979 | Bertelsen | 180/128 |
| 4,290,500 | 9/1981 | Hopkins et al. | 180/117 |
| 4,534,434 | 8/1985 | Stocking | 180/120 |
| 4,643,268 | 2/1987 | Jones et al. | 180/125 X |

FOREIGN PATENT DOCUMENTS 1220082  1/1971  United Kingdom ............... 180/128

*Primary Examiner*—Kenneth R. Rice
*Assistant Examiner*—Kevin Hurley

[57] ABSTRACT

An air-cushion vehicle is provided with an intermediate plenum which provides air to the air-cushion cavity. Propulsion and steering is effected by means of two parallel double-ended ducts that are supplied air from the plenum. Complementary controlled flaps in the ends of the ducts allow the vehicle to be controlled, both for linear motion and for steering, through a two channel radio-control system.

8 Claims, 6 Drawing Sheets

HOVERCRAFT CONTROL SYSTEM

FIELD OF THE INVENTION

This invention relates to a hovercraft air-cushion system, and control system wherein directed thrust is used to provide both propulsion and steering. Most particularly, this invention relates to a hovercraft vehicle that has an improved air-cushion effect. Further, using the novel control features, the vehicle may be remotely controlled using a two channel radio-control, or two function, steering and control arrangement.

BACKGROUND TO THE INVENTION

A variety of designs for hovercraft air-cushion vehicles have been proposed which rely on paired horizontal thrusters for propulsion. In one example, U.S. Pat. No. 3,265,142 to Winter, separate propeller means are provided within each thrust tube.

In the prior art, U.S. Pat. No. 3,605,937 to Kirwan discloses a hovercraft which is propelled in forward or reverse directions by a doubly-directed ducted flow of air. Air to propel an air-cushion supported vehicle is directed in either the forward or reverse directions by a pair of complementary front and rear flaps or panels, arranged to rotate within such opposite ends in an out-of-phase relationship.

The phase relationship of these flaps is such that all of the available air in the duct may be directed alternately in the forward or in the reverse directions, or may be proportioned between such directions. This is accomplished by a series of linkages that cause these flaps to rotate, in butterfly valve fashion, in unison at their respective locations. As one flap opens, the other flap closes. This allows air flow to be allocated to exit from the duct at either end in desired proportions.

A single fan is proposed in Kirwan to provide both lift for the vehicle and forward or reverse thrust. This fan pressurizes the air-cushion cavity or region between the vehicle and the ground; and pressurized air for the directed ducts is drawn directly from this region.

Kirwan relies on the opposed ends of the ducts to provide forward and reverse propulsion. To effect changes in direction, steering vanes, in the form of rudders, are placed in the path of the air exiting the propulsion ducts. These vanes are separately controlled through rotation of a steering wheel arrangement.

Kirwan mentions the possibility of providing two or more for ducts to provide a resultant horizontal thrust component. But he stipulates that such ducts must be arranged so that the resultant horizontal component of thrust cancels out in a steady state. He also states that this resultant thrust is preferably arranged so that the air directed from the ducts passes in a direction, along a line which passes through the vertical central axis of the vehicle.

The consequence of this last stipulation is that multiple ducts, as proposed by Kirwan, function only to provide linear propulsion. Steering in such an arrangement is effected through only the steering vanes.

Kirwan suffers from a deficiency that arises from the use of a single air-compression fan or propeller. This fan imparts a rotational momentum to the compressed air, and the reaction on the fan is transferred to the vehicle as an inclination or bias to counter-rotate in the opposite direction to the rotation of the fan blades. While this tendency may be overcome by vectored thrusts of corrective air jets emitted horizontally in the appropriate direction, the accurate balancing of this effect is difficult to control precisely.

An earlier invention by one of the co-inventors herein, U.S. Pat. No. 3,746,116 to John Schwingshandl, proposes to overcome this pivotal effect by dividing the main air cavity inside the air-cushion vehicle skirts into at least four separate compartments. Air to each compartment is then provided through butterfly valves from an intermediate chamber (described in Schwingshandl as "unseen") located between the air-cushion cavity and the fan. Through use of the butterfly valves, the flow of air into each compartment is controlled. As such, this air flow is variable and not pre-fixed, or determined by fixed vehicular arrangements.

Schwingshandl relies on the use of rudder blades placed in the wash from horizontal ducts for directional control, as well.

These prior art arrangements lack the convenience of the features of the invention, which will now be described.

SUMMARY OF THE INVENTION

In accordance with the invention an air-cushion vehicle comprises:

(1) a body defining an air-cushion cavity through which compressed air provides vehicular support;

(2) air pressurization means mounted on said body providing entry of pressurized air into said vehicle through an inlet opening of specific diameter;

(3) an intermediate plenum communicating with said air pressurization means and communicating with said air-cushion cavity through plurality of immediate openings of fixed dimensions by which pressurized air may flow from said plenum to said cavity, wherein said intermediate openings have a total area which is less than the area of said inlet opening.

By a further feature of the invention, the ratio of the area of the fan inlet opening to the total area of the openings communicating the intermediate plenum with the air cushion cavity is in the range of from 4 to 1 to 1.25 to 1, and more preferably, about 2:1.

This configuration, as opposed to the prior art, provides unrestricted openings between the intermediate plenum and the air-cushion cavity. Such openings are, however, of a specific limited size. Superior performance has been found with this arrangement. It is believed that such performance may be partially due to the dynamic reaction of the flow of air through these openings, as well as the customary static effect of the compressed air on which air-cushion vehicles rely. This is, however, only a theory.

By a further feature the invention an air cushion vehicle is provided with a pair of substantially parallel double-ended ducts, each duct being symmetrically located on opposed sides of the central axis of the vehicle. Each duct is connected to a source of compressed air and is provided at its respective exit ends with respective closure means. These closure means operate in a complementary fashion from a single control, so as to allow compressed air entering said duct to be proportioned between the respective exit ends of such duct. The flow from the ends of each respective duct may be separately controlled.

This arrangement allows the vehicle to be both propelled and steered by varying the proportions of air escaping from the ends of the ducts. Through use of two ducts, both the linear propulsion and steering functions can be controlled using only two control inputs, in the same fashion as in a tracked vehicle.

By a further feature of the invention, control over the proportions of air exiting the ends of each duct is effected by closure positioning means that responds to a radio-controlled signal means which utilizes a single transmission channel for each duct.

The use of a dual channel radio control system minimizes cost. Two channel signaling is possible because the vehicle of the invention can be fully controlled using only two independent signals: one for the position of the closure means in each duct.

By a further feature of the invention, air for said ducts is sourced from an intermediate plenum which plenum is pressurized by a fan mounted in a fan intake passage. This intermediate plenum may also supply air to the air-cushion cavity that provides vehicular support, through openings of a predetermined fixed size communicating between said plenum and said cavity. Alternately, the intermediate plenum may supply air only to the ducts.

These and further features of the invention will be better understood from the description of the preferred embodiments which now follow.

DESCRIPTION OF THE PREFERRED EMBODIMENTS

Figure 1:
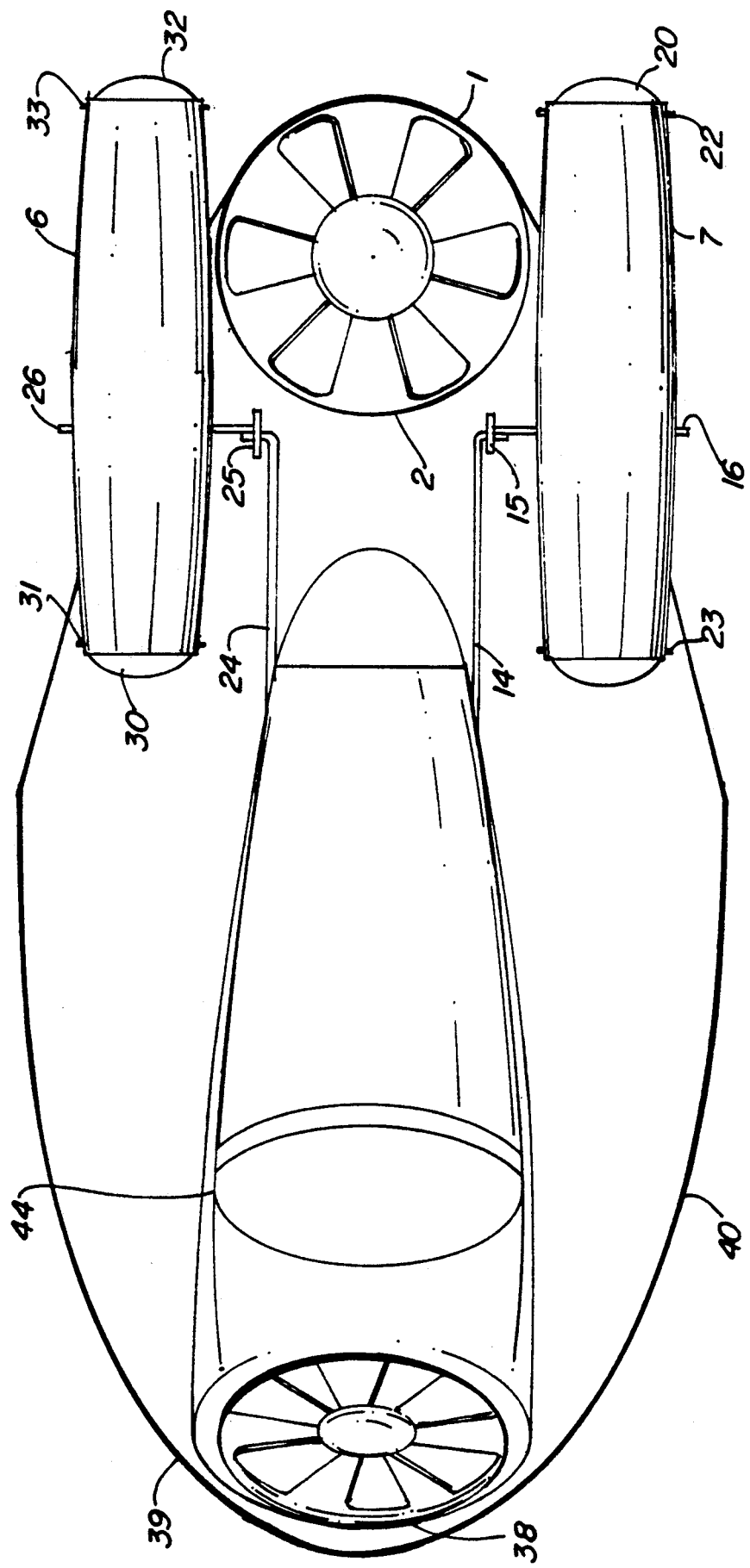
FIG. 1 is a plan view of a hovercraft with two fan and two thrust ducts.
Figure 2:
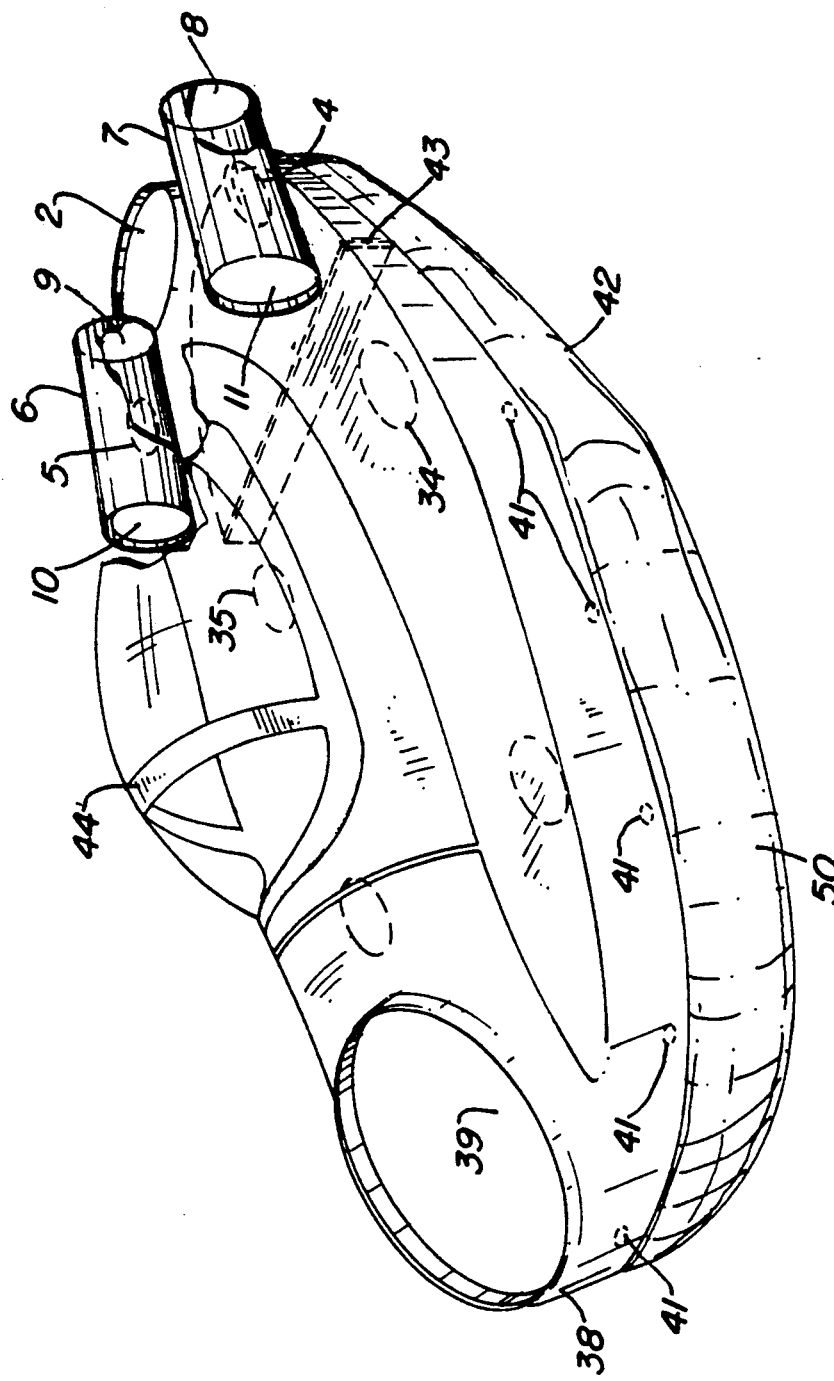
FIG. 2 is a perspective view of the vehicle of FIG. 1.

In FIG. 1 fan 1 mounted in duct 2 forces air into thrust plenum 3, as shown in FIG. 2. The air from fan 1 is forced under pressure through openings 4 and 5 into the thrust tubes 6 and 7. These tubes 6, 7 each have open ends 8, 9, 10, 11.

Figure 3:
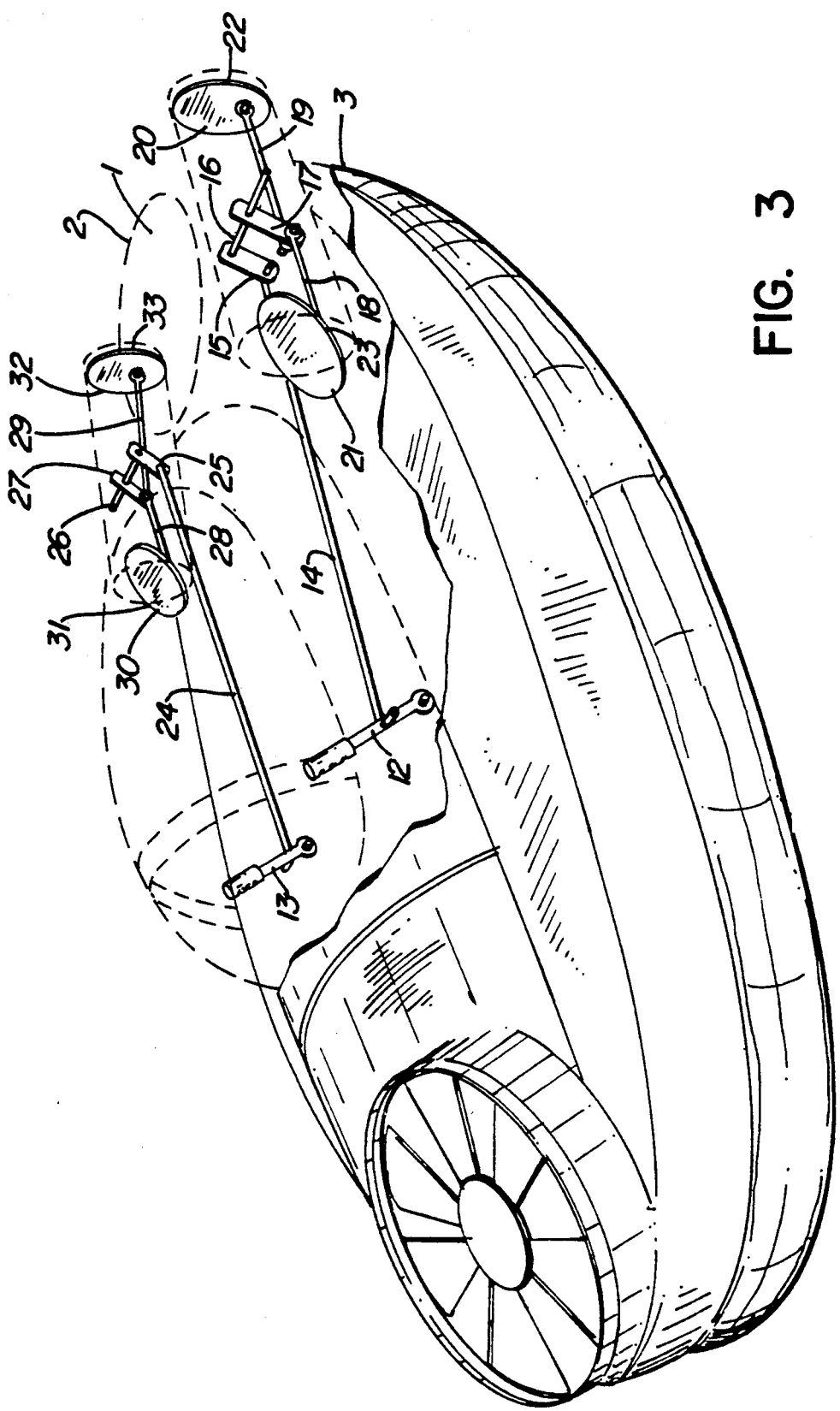
FIG. 3 is a perspective cut-away of FIG. 1 showing the linkages within the thrust ducts.

To propel the vehicle forward levers 12 and 13 must be activated. As shown in FIG. 3, rearward movement of lever 12 pushes rod 14 activating crank 15 mounted on the outside of tube 7. Crank 15 rotates on axle 16, which is mounted through tube 7, to turn crank 17 which is affixed to axle 16 inside tube 7. In doing so cranks 17 and 15 move parallel to each other. Crank 17 pulls rod 18 connected to valve 21, pivoting on axle 23 in opening 11 of tube 7. This closes the opening 8. The same motion of crank 17 pushes rod 19 connected to valve 20, pivoting on axle 22 in opening or outlet 8 on the aft end of tube 7. With valve 20 fully open, valve 21 becomes fully closed causing the air to exit from tube 7 via outlet 8.

Similarly placing the right hand lever 13 in the same rearward position, rod 24 activates a linkage contained in tube 6 identical to that contained in tube 7. With both levers pulled to the rear, the valves 21 and 30 positioned in the front openings 11 and 10 respectively of tubes 7 and 6 respectively are fully closed forcing all the air from thrust plenum 3 through openings 4 and 5 and further past valves 20 and 32 in openings 8 and 9 of tubes 7 and 6 thus propelling the unit forward.

Reverse is performed by moving levers 13 and 12 fully forward to the position shown in FIG. 3. This activates the linkages contained in the tubes 7 and 6 in exactly the opposite manner described above, leaving the valve 20 in opening 8 of tube 7 fully closed and valve 32 in opening 9 of tube 6 fully closed. This results in valve 21 in opening 11 of tube 7 being open, and valve 30 of opening 10 of tube 6 being opened. The result is that the air from thrust plenum 3 is forced through openings 4 and 5 into tubes 7 and 6 and past valves 21 and 30, and out through openings 23 and 31 of tubes 7 and 6.

Whatever position levers 12 or 13 are initially, the opposite of that position places an equal and opposite reaction. Inasmuch as the linkages are independent they may be placed in opposite positions to accommodate clockwise or counter clockwise motion. If lever 12 were pulled rearward and lever 13 pushed forward, then the air in tube 7 would leave by way of opening 8, but the air in tube 6 would exit by the front opening 10, directing the front of the vehicle to the right. Maintained in this position the vehicle would rotate continuously clockwise. When lever 13 is pulled rearward and lever 12 forward, the air in tube 7 is forced out through opening 11 and from tube 6 through opening 10 causing the front of the vehicle to go left. Maintained in this position the vehicle will rotate counter clockwise.

Figure 4:
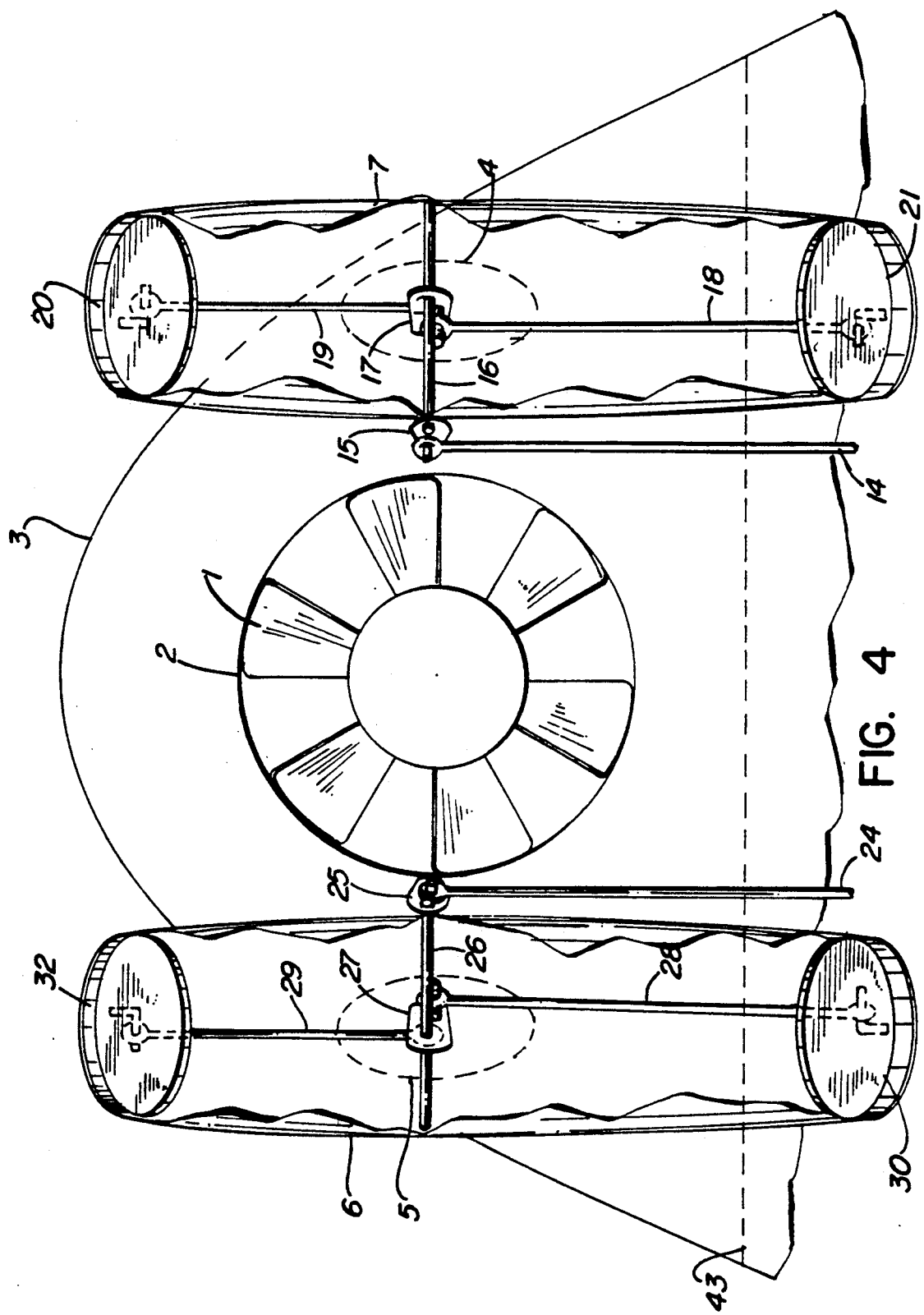
FIG. 4 is a plan view cut-away showing the linkages within the thrust ducts.

Alternately, levers 12 and 13 could be left in an intermediate or neutral position causing the vehicle to remain at rest. FIG. 4 shows the valves 21 and 20 in openings 11 and 8 respectively of tube 7, and 30 and 32 of openings 10 and 9 respectively of tube 6 in this intermediate position. The force produced at the front of the vehicle is thereby cancelled out by an equal force produced in the rear of the vehicle.

FIG. 2 shows a vehicle with two fans, wherein thrust fan 1 in duct 2 is intended for thrust, as described above, and lift fan 39 in duct 38 mounted on the front of the vehicle is intended to provide a source of pressure for lift. The lifting air is forced into lift plenum 40 filling left plenum 40. Air then flows into the air-cushion cavity 50 directly through principal outlets 34, 35, 36, 37 in the common wall 51 between the lift plenum 40 and the air-cushion cavity 50. This fills the air-cushion cavity located underneath the common wall 51 and within peripheral curtain 42 with pressurized air. Some air is also directed outwardly against the curtain 42 by way of small curtain-supporting tubes 41.

It has been found that a superior lift effect is obtained if the combined area of the outlets is on the order of half the area occupied by the fan 39.

The lift plenum 40 is separated in the embodiment of FIG. 2 from the thrust plenum 2 by a dividing wall 43. In the case of the thrust plenum 2, it has been found that, preferably, the effective area of the duct outlets 8, 9, 10, 11, allowing for the effect of the valves 20, 21, 30, 32 may be on the order of the surface area of fan 2; certainly, no greater; and more preferably no more than 50 percent of the area of the fan 2.

Figure 5:
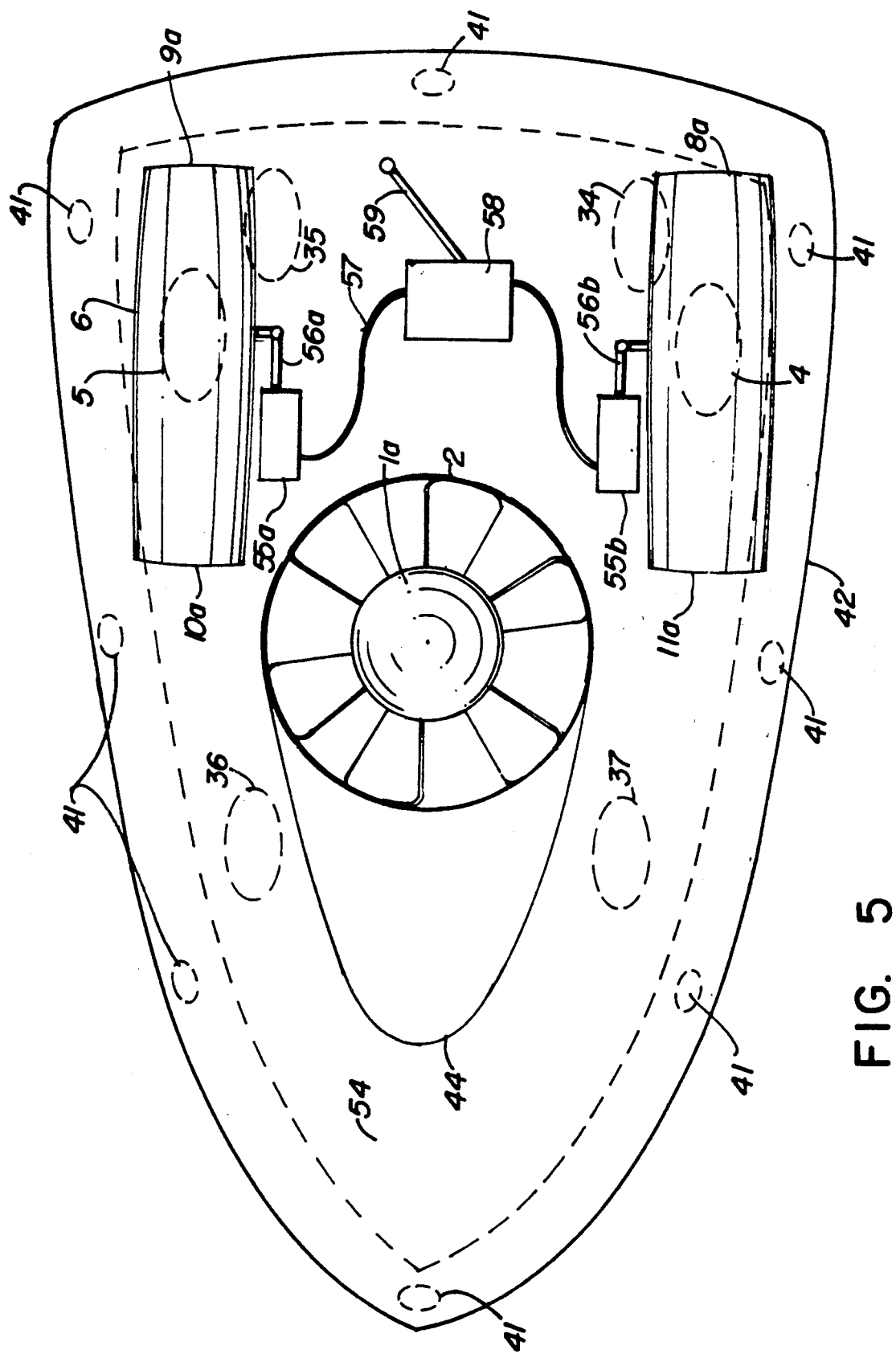
FIG. 5 is a plan view of an alternate air-cushion vehicle with one fan and two thrust ducts.
Figure 6:
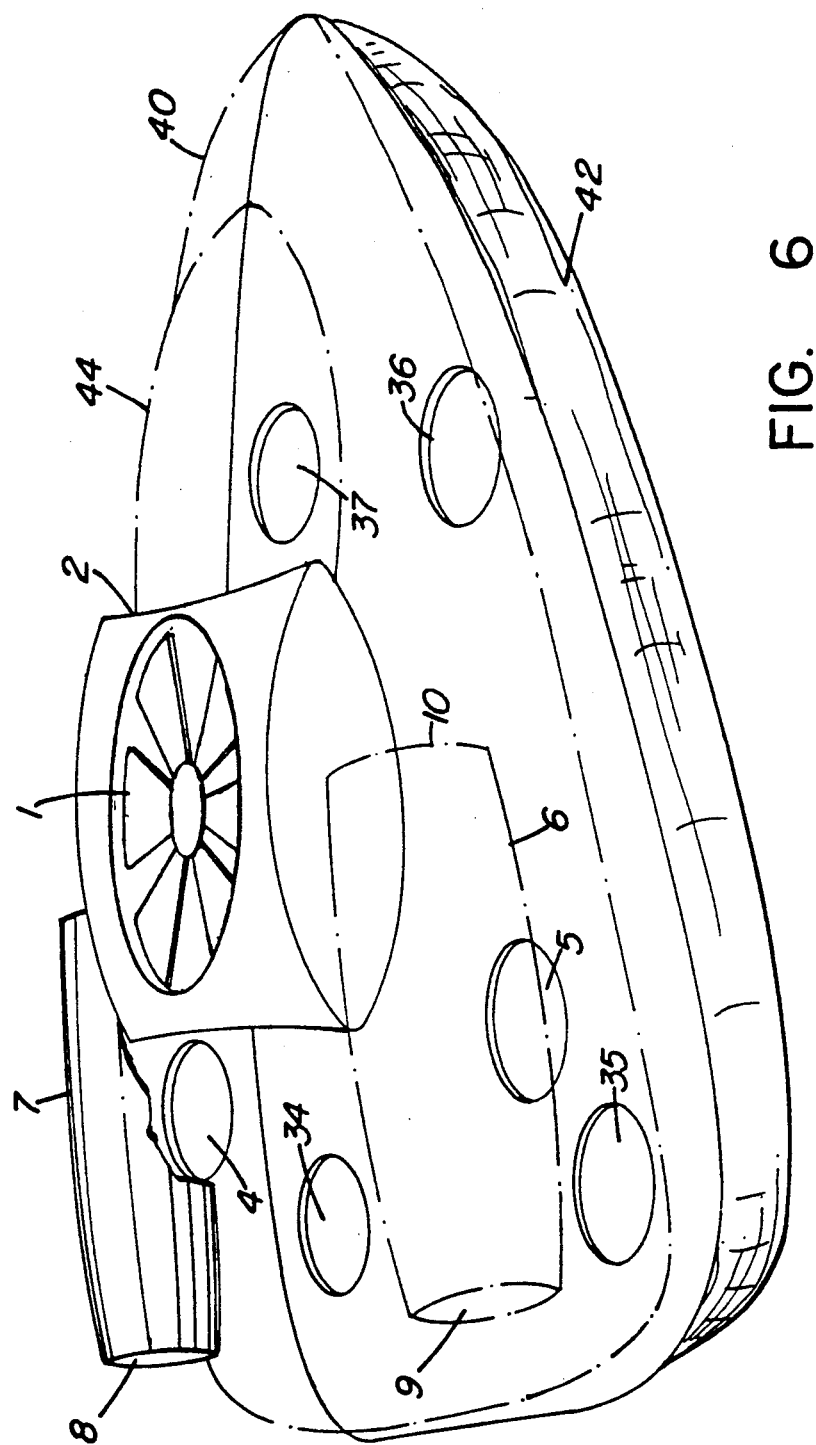
FIG. 6 is a cut-away perspective view of the vehicle of FIG. 5.

FIGS. 5 and 6 show a small combined plenum 54 serving for both thrust and lift. The propulsion and directional functions within the ducts 6 and 7 in this embodiments are exactly the same as the aforementioned linkages from FIG. 3 and 4. The the total area of the outlets 34, 35, 36 and 37 that provide lift is again no more than the total area of the fan 1a, which provides both lift and thrust. Further, the effective area of the thrust outlets 8a, 9a, 10a, 11a on the combined unit should preferably be not be more than about 50 percent of the total area of the fan 1. It is possible for the combined unit to have a ratio of 1:1 for total fan to total outlet areas effective as an upper limit, but a ratio of between 3:2 and 4:3 is preferred. This is a preferred embodiment for toy radio-controlled hobby-type vehicles because of the convenience of having only one fan.

FIG. 3 shows manual controls 12, 13 for propulsion and steering. In FIG. 5 electrically controlled actuators 55a, 55b are coupled through shafts 56a, 56b that are analogous to rods 24, 14 in FIG. 2. These actuators 55a, b receive signals through wires 57 from a radio receiver 58, equipped with an antenna 59.

By reason of the combined functions of the thrust ducts 6, 7, it is sufficient for receiver 58 to have two channels only. This suits this embodiment particularly to the toy or hobby market.

On a 14½ inch toy model that has been built thrust outlets 8a, 9a, 10a, 11a of 1.4 inch diameter were provided with an intake fan diameter of 4.2 inches. The lift outlets 34, 35, 36 and 37 on the same unit were 1.25 inches in diameter.

The motor for the fax (not shown) was a Kyosho AP29 operating at 16000 rpm off 6 re-chargeable nickel cadmium batteries providing 7.2 volts. This units weights 2 lbs. 6 oz. and can lift a 3 lb. payload. It has a ground clearance of 1¼ inches when unloaded.

The foregoing has constituted a description of preferred embodiments which are intended only to be exemplary of the invention. The invention in its basic and more particular aspects is further described and defined in the claims which now follow.

We claim:

1. An air-cushion vehicle comprising:
   (1) a body defining an air-cushion cavity through which compressed air provides vehicular support;
   (2) air pressurization means mounted on said body providing entry of pressurized air into said vehicle through an inlet opening of specific cross-sectional area;
   (3) an intermediate plenum communicating with said air pressurization means through intermediate openings of a total specific cross-sectional area by which pressurized air may flow from said plenum to said cavity,
   wherein the total area of said intermediate openings is less than the area of said inlet opening.

2. An air-cushion vehicle as in claim 1 wherein the area of said intermediate opening is between 25 and 85 percent of the area of said inlet opening.

3. An air-cushion vehicle as in claim 1 wherein the area of said intermediate openings is about 50% of the area of said inlet opening.

4. An air cushion vehicle comprising:
   (a) a source of compressed air located on said vehicle;
   (b) a pair of substantially parallel double-ended ducts, each duct being symmetrically located on opposed sides of the central axis of said vehicle and being continually connected to and pressurized by said source of compressed air;
   (c) each of said ducts being provided at its respective exit ends with respective closure means, operating in complementary fashion from a single control, so as to allow compressed air entering said duct to be proportioned between the respective exit ends of such duct, and
   (d) control means for separately controlling the flow of air from the ends of each of said respective ducts.

5. An air cushion vehicle as in claim 1 further comprising:
   (a) a pair of substantially parallel double-ended ducts, each duct being symmetrically located on opposed sides of the central axis of said vehicle and being continually connected to and pressurized by air supplied from said air pressurization means through said intermediate plenum, each of said ducts being provided at its respective exit ends with respective closure means, operating in complementary fashion from a single control, so as to allow pressurized air entering said cut to be proportioned between the respective exit ends of such duct, and
   (b) control means for separately controlling the flow of air from the ends of each of said respective ducts.

6. An air-cushion vehicle as in claim 5, wherein the total area of said intermediate openings is between 25 and 85 percent of the area of said inlet opening.

7. An air-cushion vehicle as in claim 6, wherein the total area of said intermediate openings is about 50% of the area of said inlet opening.

8. An air-cushion vehicle as in claim 5, wherein the total area of the maximum effective opening area at each of the exit ends of said ducts plus the total area of the intermediate openings is between 60 and 70 percent of the area of said inlet opening.

* * * * *